(12) United States Patent
Touray et al.

(10) Patent No.: US 10,034,203 B2
(45) Date of Patent: *Jul. 24, 2018

(54) SYSTEM AND METHOD FOR RESTRICTING MOBILITY IN WIRELESS NETWORKS

(71) Applicant: Apple Inc., Cupertino, CA (US)

(72) Inventors: Yusupha Touray, Kanata (CA); Fayaz Kadri, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,923

(22) Filed: Feb. 8, 2018

(65) Prior Publication Data

US 2018/0176832 A1 Jun. 21, 2018

Related U.S. Application Data

(63) Continuation of application No. 15/463,626, filed on Mar. 20, 2017, now Pat. No. 9,930,577, which is a continuation of application No. 13/296,746, filed on Nov. 15, 2011, now Pat. No. 9,648,489, which is a continuation of application No. 11/634,775, filed on Dec. 6, 2006, now Pat. No. 8,086,235.

(51) Int. Cl.
*H04W 4/00* (2018.01)
*H04W 36/00* (2009.01)
*H04W 48/20* (2009.01)

(52) U.S. Cl.
CPC ....... *H04W 36/0005* (2013.01); *H04W 48/20* (2013.01)

(58) Field of Classification Search
CPC .... G01S 5/0027; G01S 5/0054; G01S 5/0205; G01S 5/021; G01S 5/0252; G01S 19/17; G01S 19/34; H04W 36/0005; H04W 48/20
USPC ........................................................ 455/436
See application file for complete search history.

(56) References Cited

U.S. PATENT DOCUMENTS

| | | | |
|---|---|---|---|
| 6,073,010 A * | 6/2000 | Dufour | H04W 84/14 455/432.3 |
| 6,212,390 B1 | 4/2001 | Rune | |
| 6,230,017 B1 * | 5/2001 | Andersson | H04W 4/24 455/433 |
| 6,999,434 B1 | 2/2006 | Agrawal et al. | |

(Continued)

OTHER PUBLICATIONS

C80216e-03_29r1, IEEE standards document, May 2003.

(Continued)

*Primary Examiner* — William Nealon
(74) *Attorney, Agent, or Firm* — Meyertons, Hood, Kivlin, Kowert & Goetzel, P.C.

(57) ABSTRACT

This invention provides a method, system and apparatus for controlling mobility on a wireless network, which includes retrieving a network mobility preference, the network mobility preference indicating a level of mobility service for the mobile station, the level of mobility service indicating the extent to which the mobile station can handoff among base stations of the wireless network, and establishing a level of mobility service for the mobile station based on the retrieved network mobility preference. The method and apparatus may further include determining the level of mobility service for the mobile station to be fully or partially restricted based on the mobility preference.

20 Claims, 8 Drawing Sheets

(56) References Cited

U.S. PATENT DOCUMENTS

| | | | |
|---|---|---|---|
| 7,302,264 B2 * | 11/2007 | Yoon | H04W 36/0033 |
| | | | 455/436 |
| 7,373,147 B2 | 5/2008 | Noguchi et al. | |
| 7,979,072 B2 | 7/2011 | Senarath et al. | |
| 8,437,461 B1 | 5/2013 | Gartner et al. | |
| 8,437,760 B2 | 5/2013 | Senarath et al. | |
| 8,442,009 B2 | 5/2013 | Senarath et al. | |
| 9,307,472 B2 | 4/2016 | Senarath et al. | |
| 9,363,729 B2 | 6/2016 | Senarath et al. | |
| 9,648,533 B2 | 5/2017 | Senarath et al. | |
| 2001/0034235 A1 | 10/2001 | Froula | |
| 2002/0123348 A1 | 9/2002 | Willars et al. | |
| 2004/0109425 A1 | 6/2004 | Scribano et al. | |
| 2004/0157600 A1 | 8/2004 | Stumpert et al. | |
| 2005/0185626 A1 | 8/2005 | Meier et al. | |
| 2005/0221823 A1 * | 10/2005 | Noguchi | H04W 60/04 |
| | | | 455/435.1 |
| 2005/0272481 A1 * | 12/2005 | Kim | H04L 29/12273 |
| | | | 455/574 |
| 2005/0277417 A1 * | 12/2005 | Yoon | H04W 36/0033 |
| | | | 455/436 |
| 2007/0064903 A1 * | 3/2007 | Xiang | H04L 12/66 |
| | | | 379/202.01 |
| 2008/0049674 A1 * | 2/2008 | Cha | H04W 36/0055 |
| | | | 370/331 |
| 2017/0238225 A1 | 8/2017 | Senarath et al. | |

OTHER PUBLICATIONS

C802163-05_324, IEEE standards document, Jul. 2005.
802.16e-2005, IEEE standards document, Feb. 2006.
IEEE Std 802.16e-2005.

* cited by examiner

SYSTEM AND METHOD FOR RESTRICTING MOBILITY IN WIRELESS NETWORKS

CROSS-REFERENCE TO RELATED APPLICATION

This application is a continuation of U.S. patent application Ser. No. 15/463,626, filed Mar. 20, 2017, entitled SYSTEM AND METHOD FOR RESTRICTING MOBILITY IN WIRELESS NETWORKS, which is a continuation of U.S. patent application Ser. No. 13/296,746, filed Nov. 15, 2011, now U.S. Pat. No. 9,648,489, entitled SYSTEM AND METHOD FOR RESTRICTING MOBILITY IN WIRELESS NETWORKS, which is a continuation of U.S. patent application Ser. No. 11/634,775, filed Dec. 6, 2006, now U.S. Pat. No. 8,086,235, entitled SYSTEM AND METHOD FOR RESTRICTING MOBILITY IN WIRELESS NETWORKS, the entirety of which are incorporated herein by reference.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

STATEMENT REGARDING FEDERALLY SPONSORED RESEARCH OR DEVELOPMENT n/a

FIELD OF THE INVENTION

The present invention relates to communication networks, and more particularly to a method and apparatus for controlling mobility of a mobile station in a wireless communication network.

BACKGROUND OF THE INVENTION

As the demand for high speed broadband networking over wireless communication links increases, so too does the demand for different types of networks that can accommodate high speed wireless networking. For example, the deployment of Institute of Electrical and Electronics Engineers ("IEEE") 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extend through other technologies such as cellular technology; data throughput using current cellular technologies is limited to a few MB/sec. Put simply, as the distance from the base station increases, the need for higher transmission power increases and the maximum data rate typically decreases. As a result, there is a need to support high-speed wireless connectivity beyond a short distance such as within a home or office.

As a result of the demand for longer range wireless networking, the IEEE 802.16 standard was developed. The IEEE 802.16 standards are often referred to as WiMAX or less commonly as WirelessMAN or the Air Interface Standard. These standards provide specifications for fixed broadband wireless metropolitan access networks ("MAN" s) that use a point-to-multipoint architecture (IEEE 802.16d) and combined fixed and mobile broadband wireless access system's (IEEE 802.16e). Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own.

The 802.16 standards support high bit rates in both uploading and downloading from a base station up to a distance of about 30 miles (about 50 km) to handle such services as VoIP, IP connectivity and other voice and data formats, e.g., time division multiplexing ("TDM"). Expected data throughput for a typical WiMAX network is 45 MBits/sec. per channel. The 802.16e standard defines a media access control ("MAC") layer that supports multiple physical layer specifications customized for the frequency band of use and their associated regulations. This MAC layer uses protocols to ensure that signals sent from different stations using the same channel do not interfere with each other and "collide".

The IEEE 802.16e air interface standard and corresponding WiMAX network architecture standard, as defined by the WiMAX forum, is primarily designed to support user/device mobility. Some network operators have readily available radio spectrum for deploying an 802.16e network; however, governmental regulations may restrict usage of these radio spectrums for supporting mobile wireless devices. In other words, although a network is fully compliant with the IEEE 802.16e standard and capable of supporting full mobility services for mobile wireless devices, government regulations require that the mobility services be either partially or completely restricted or unavailable to the wireless devices. It is therefore desirable to have methods and systems to prevent full or partial mobility support for IEEE 802.16e compliant wireless devices without requiring any changes to either the IEEE 802.16e standard, the Network Architecture as defined by the WiMAX Forum, the mobile devices themselves or the over the air control messages exchanged between the device and the network.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

This invention provides a method, system and apparatus for controlling mobility on a wireless network, which includes retrieving a network mobility preference, the network mobility preference indicating a level of mobility service for the mobile station, the level of mobility service indicating the extent to which the mobile station can handoff among base stations of the wireless network, and establishing a level of mobility service for the mobile station based on the retrieved network mobility preference.

In accordance with one aspect, the present invention provides a method for controlling mobility on a wireless network, the method includes retrieving a network mobility preference, the network mobility preference indicating a level of mobility service for the mobile station, the level of mobility service indicating the extent to which the mobile station can handoff among base stations of the wireless network, and establishing a level of mobility service for the mobile station based on the retrieved network mobility preference.

In accordance with another aspect, the present invention provides an apparatus for controlling mobility on a wireless network, the apparatus includes a mobility disabling control module, the mobility disabling control module configurable to restrict mobility of a mobile station in the wireless network by using a network mobility preference to establish a level of mobility service for a mobile station based on the network mobility preference.

In accordance with yet another aspect, the present invention provides a gateway for controlling mobility on a wireless network, which includes a memory for storing data from corresponding to at least one network mobility preference; and a processor, the processor operates to receive a handoff request message from a network device, to analyze the handoff request message to determine a level of mobility service to assign to a mobile station and to establish a level of mobility service for the mobile station based on the network mobility preference.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

This invention provides a method, system and apparatus for controlling mobility in a wireless network that deploys the air interface defined by the Institute of Electrical and Electronics Engineers ("IEEE") 802.16e standard, and the corresponding worldwide interoperability for microwave access ("WiMAX") network architecture standard as defined by the WiMAX Forum.

Figure 1:
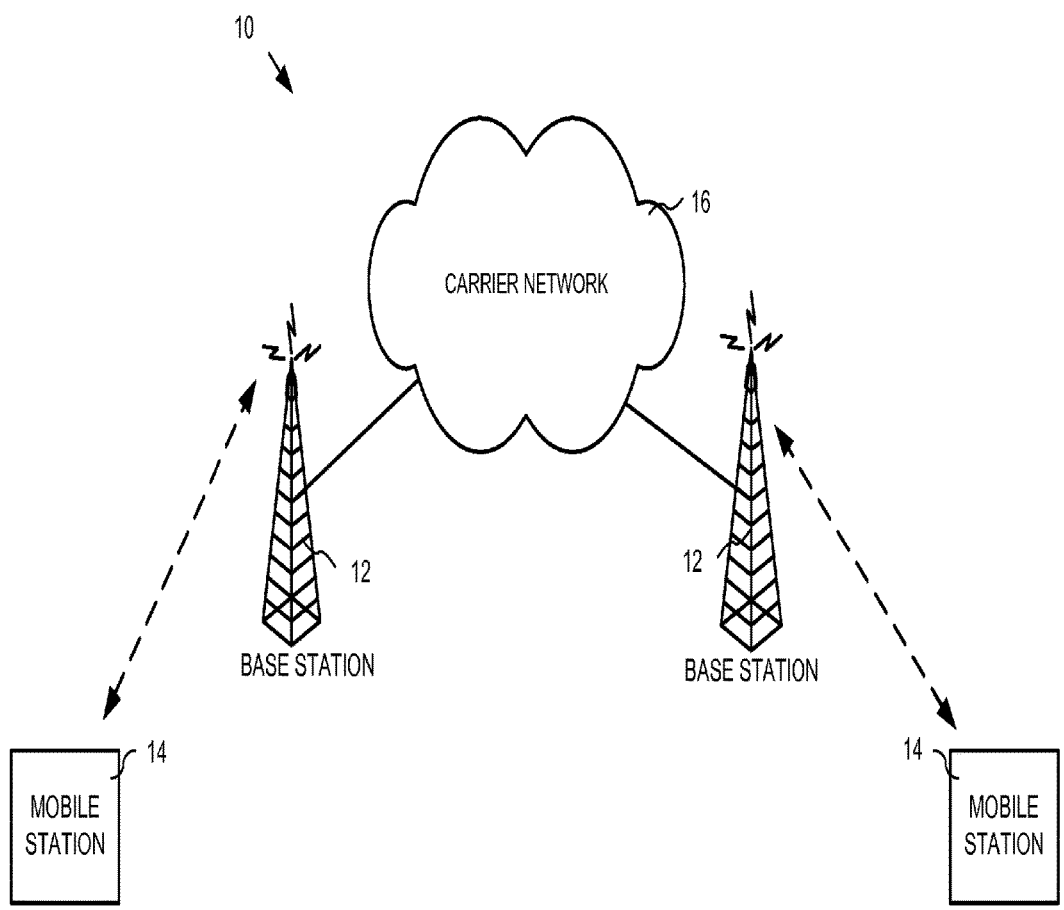
FIG. 1 is a block diagram of the network architecture of a communication network constructed in accordance with the principles of the present invention.

Referring now to the drawing figures in which like reference designators refer to like elements, there is shown in FIG. 1, a system constructed in accordance with the principles of the present invention and designated generally as "10." System 10 includes base stations 12 ("BS") and mobile stations 14 ("MS"). Base stations 12 engage in wireless communication with mobile stations 14. Similarly, mobile stations 14 engage in wireless communication with base stations 12.

Base station 12 can be any base station arranged to wirelessly communicate with mobile stations 14. Base stations 12 include the hardware and software used to implement the functions described herein to support the MAC control plane functions. Base stations 12 include a central processing unit, transmitter, receiver, I/O devices and storage such as volatile and nonvolatile memory as may be needed to implement the functions described herein.

Mobile stations 14 can be any mobile station including but not limited to a computing device equipped for wireless communication, cell phone, wireless personal digital assistant ("PDA") and the like. Mobile stations 14 also include the hardware and software suitable to support the MAC control plane functions needed to engage in wireless communication with base station 12. Such hardware can include a receiver, transmitter, central processing unit, storage in the form of volatile and nonvolatile memory, input/output devices, etc.

Figure 2:
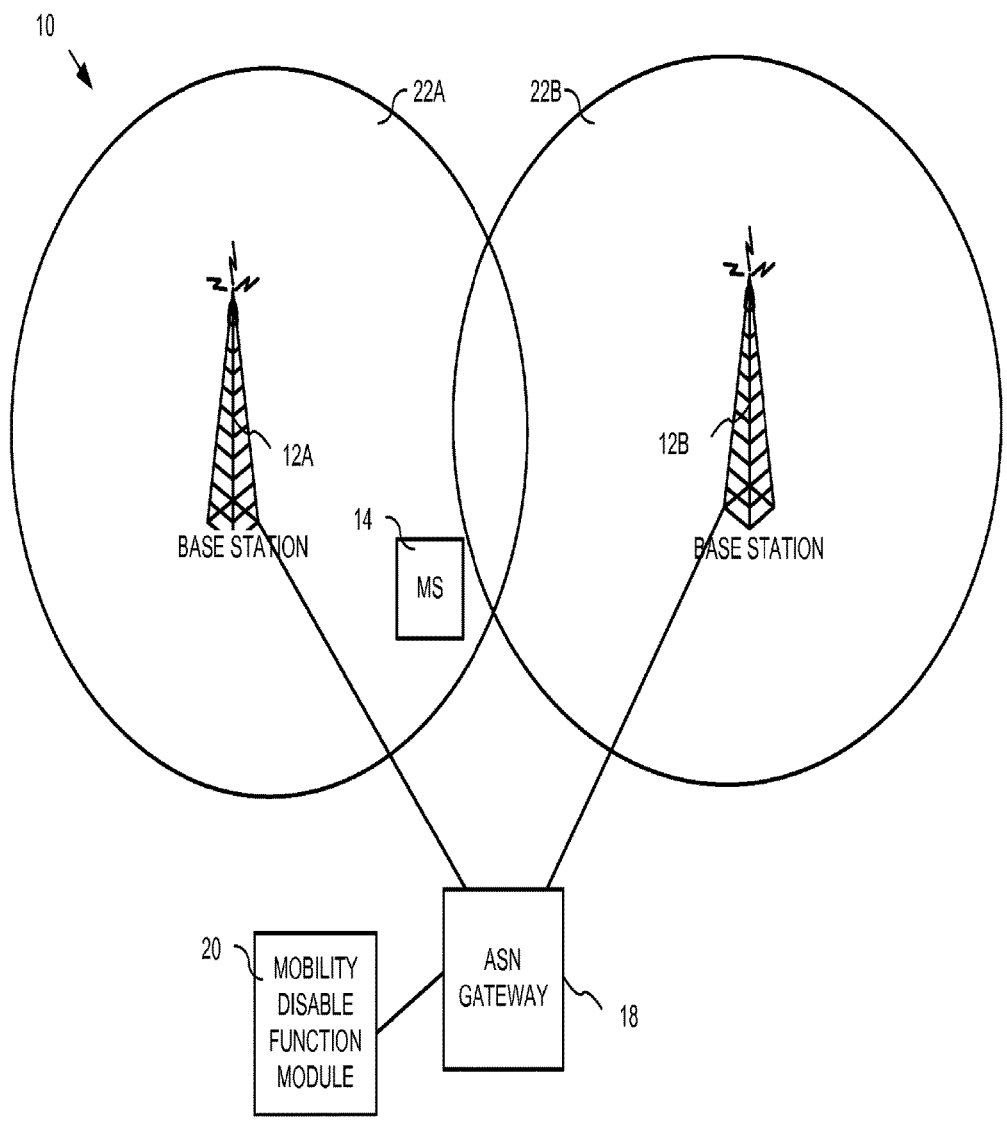
FIG. 2 is a block diagram of a first operational embodiment of the present invention.

FIG. 2 shows system 10 with an access service network gateway 18 ("ASN GW") in communication with base stations 12A, 12B in accordance with the principles of the invention (base stations 12A and 12A are referred to collectively herein as "base stations 12"). The ASN GW 18 provides an aggregation of control plane functions, e.g., mobility, in addition to performing bearer plane routing or bridging functions. The ASN gateway 18 includes the hardware and software suitable to support the MAC control plane functions used to engage in communication with base stations 12. Such hardware can include protocol translators, impedance matching devices, rate converters, fault isolators, or signal translators as necessary to provide system interoperability. More importantly, the ASN GW 18 provides a number of options for allowing mobility between base stations 12. For example, ASN GW 18 allows system operators to select "no mobility" "partial mobility" and "full mobility" options, which are selectable at the ASN GW level to restrict or control mobility support for IEEE 802.16e compliant wireless mobile stations 14. These options are functionally implemented within ASN GW 18 as described below.

In another embodiment, it may be desirable to restrict mobility from any base station to any other base station. Other examples of restricting mobility would include but are not limited to restricting mobility to groups of base stations (e.g., paging groups) with no particular geographical significance, or for those base stations within certain geographical boundaries. Additionally, mobility may be restricted based on "no-mobility" being explicitly configured on the mobility disabling control module. Other examples of criteria for no mobility would be time of day constraints, network (or base station) load, users subscription profile, and the like.

As shown in FIG. 2, mobile station 14 engages in bidirectional communication with base stations 12, which have overlapping coverage regions 22A, 22B respectively. The ASN GW 18 supports interfaces such as the WiMAX network reference architecture R6 interfaces, which implement a set of control and bearer plane protocols for communication between the base stations 12 and the ASN GW 18. The bearer plane includes an intra-ASN data path or inter-ASN tunnel between the base stations 12 and the ASN GW 18. The control plane includes protocols for IP tunnel management (establish, modify and release) in accordance with the mobile station 14 mobility events. The ASN GW 18 to base stations 12 interface may also serve as a conduit for exchange of media access control ("MAC") layer state information between neighboring base stations 12. The ASN GW 18 to mobile station 14 interface may include additional protocols related to the management plane.

In this embodiment, a mobility disabling control module 20 ("MDC") is coupled to the ASN GW 18 and provides the communications network system 10 with the capability to control the mobility service by implementing employing a MAC layer 2 handoff manager on the ASN GW 18. For example, when there is a requirement that mobility be fully restricted in communications network system 10, the layer 2 handoff manager is notified by the MDC module 20 that mobility is to be disabled, and the handoff manager of ASN GW will reject any handoff requests from mobile station 14, base stations 12 and or both mobile station 14 and base stations 12. In this way, the MDC module 20 provides a configurable feature that can control the decision-making process associated with the handoff manager of the ASN GW 18. In other words, the MDC module 20 can be seen as providing a way to implement a configurable mobility preference that indicates a level of mobility service a mobile station 14 is to have in a particular network. The MDC module 20 can be a software implementation, a hardware implementation or a combination of both.

Many of the functional units described in this specification have been labeled as modules, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
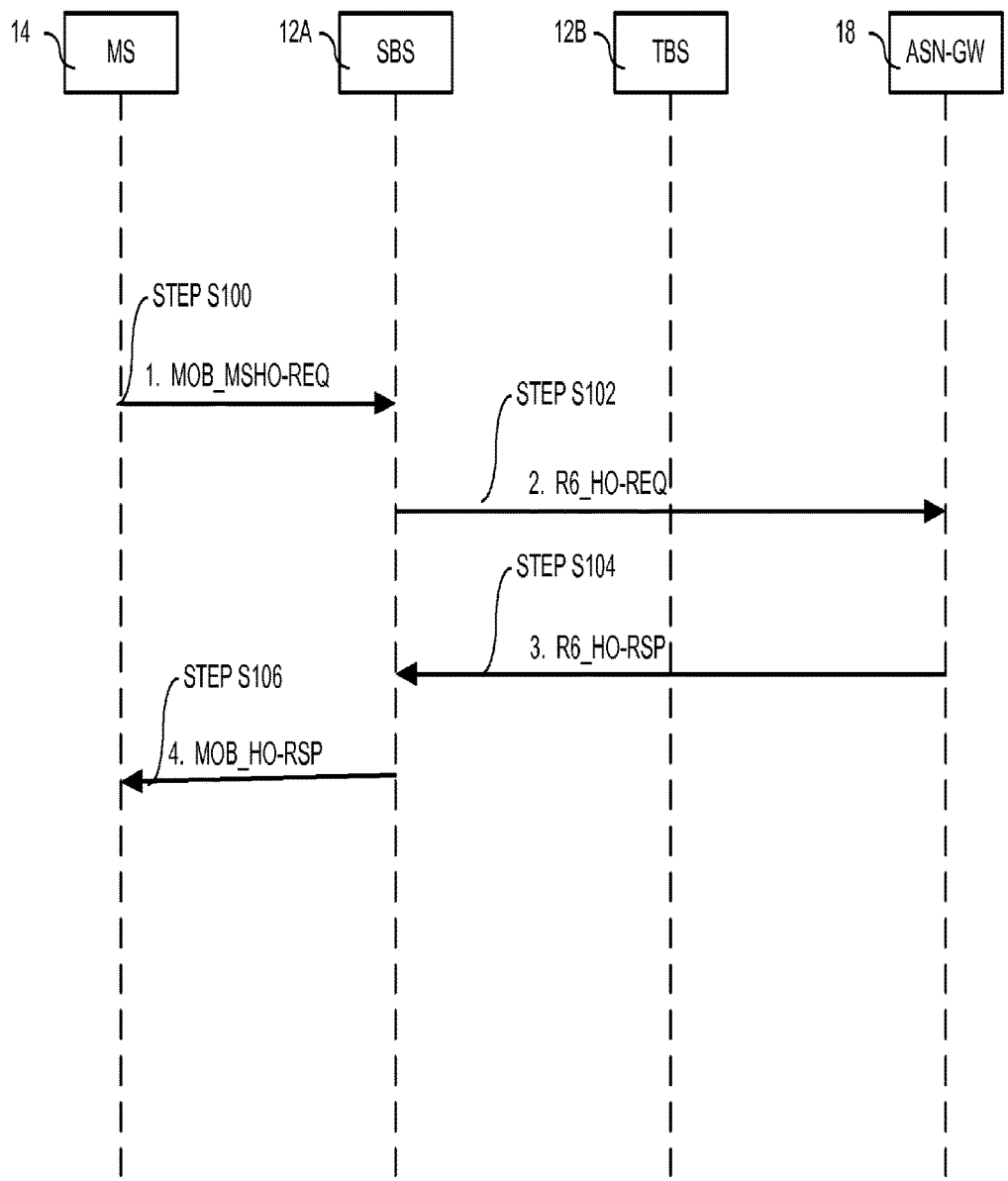
FIG. 3 is a sequence diagram illustrating a mobile station initiated handoff process.

An operational embodiment of the present invention is described with reference to FIG. 3. FIG. 3 illustrates a timing diagram of a mobile station 14 initiated handoff in an access service network ("ASN") that has had mobility disabled. The source or serving base station 12A ("SBS") and the target base station 12B ("TBS") are in communication with the ASN GW 18. The mobile station 14 initiates the handoff process by sending a handoff request message, such as the IEEE 802.16e defined MOB_MSHO-REQ to its current SBS 12A, indicating a list of potential base station(s) to which the mobile station 14 seeks a handoff (Step S100). SBS 12A receives the handoff request from mobile station 14 and sends a handoff request, such as the WiMAX networking group ("NWG") defined R6_HO-REQ to the layer 2 handoff manager of ASN GW 18 (Step S102). Because mobility is disabled on ASN GW 18, the handoff manager on the ASN GW 18 rejects the handoff request from serving base station 12A by sending a response message, such as WiMAX NWG defined R6_HO-RSP to the serving base station 12A. The rejection can be communicated to serving base station 12A by omitting to include any recommended base station in the response message (e.g., R6_HO-RSP) and/or by using an explicit reject type-length-value ("TLV") element in the message (Step S104). At Step S108, the serving base station 12A responds to the mobile station 14 with a message, e.g., an IEEE 802.16e defined MOB_B-SHO-RSP message indicating that the handoff to selected base station 12B is not recommended, e.g., with mode equal to "0b111". At this point, the mobile station 14 may reconfigure the base station list and sent another mobility handoff request, such as the IEEE 802.16e defined MOB_MSHO-REQ.

Figure 4:
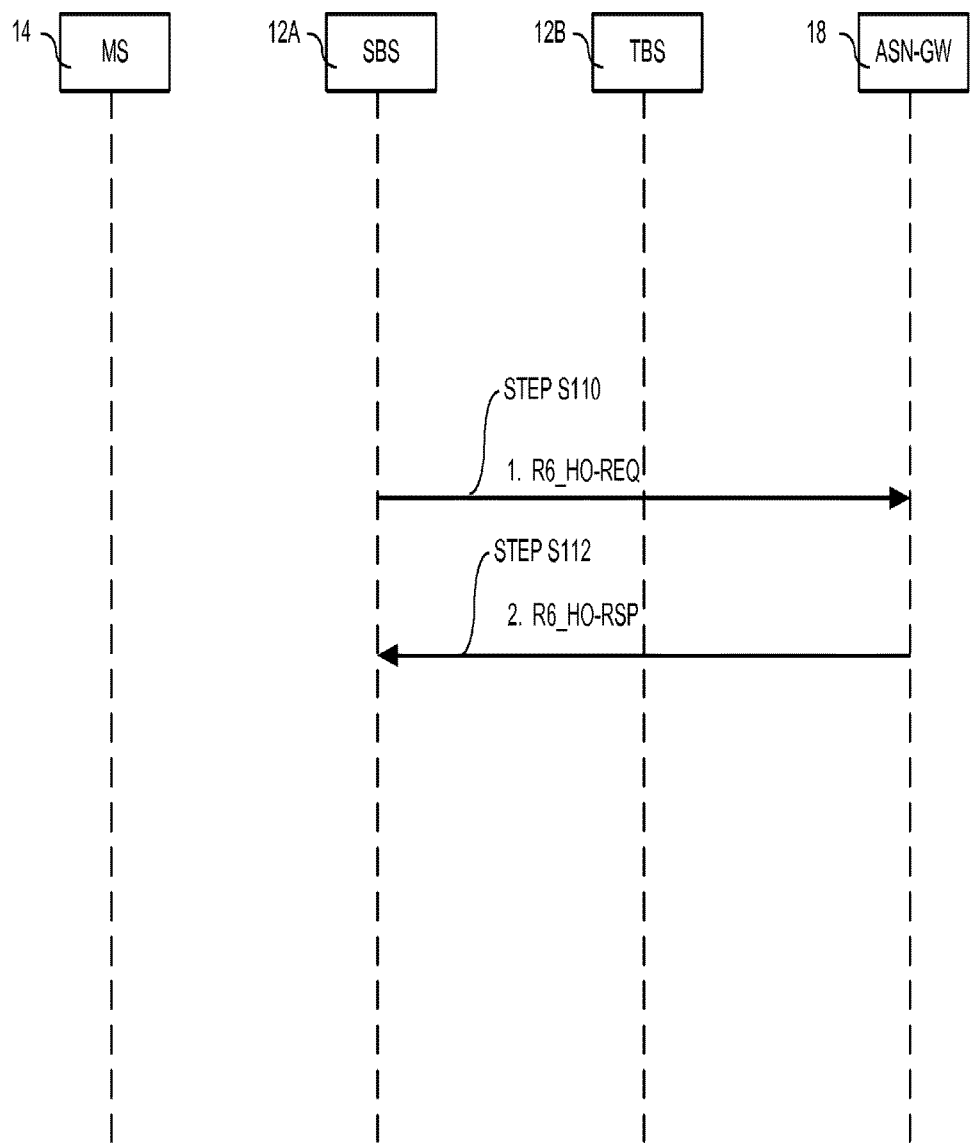
FIG. 4 is a sequence diagram illustrating a network (base station) initiated handoff process.

Referring to FIG. 4, with respect to serving base station 12A, the serving base station 12A initiates a handoff request for mobile station 14, such as the WiMAX NWG defined R6_HO-REQ to the layer 2 handoff manager of ASN GW 18 (Step S110). Since mobility is disabled on ASN GW 18, the handoff manager on the ASN GW 18 rejects the handoff request by sending a corresponding rejection message such as the WiMAX NWG defined R6_HO-RSP response to the serving base station 12A. The rejection can be communicated to serving base station 12A by omitting to include any recommended base station data in the rejection message (R6_HO-RSP) and/or by using an explicit reject TLV element in the message (Step S112). Since the handoff response message from the ASN-GW 18 (e.g., R6_HO-RSP response) signaled a rejection, the serving base station 12A will not initiate a network handoff by sending an appropriate message, e.g., an IEEE 802.16e defined MOB_BSHO-REQ. Alternatively, the MDC module 20 can be configured to provide partial disablement of mobility service conditioned upon which network element initiates the handoff request. For example, in the event that the mobile station 14 initiates a handoff request, then mobility is always disabled, however, if a base station 12A, 12B initiates the handoff request, then the layer 2 handoff manager of ASN GW 18 will permit the handoff to occur.

Figure 5:
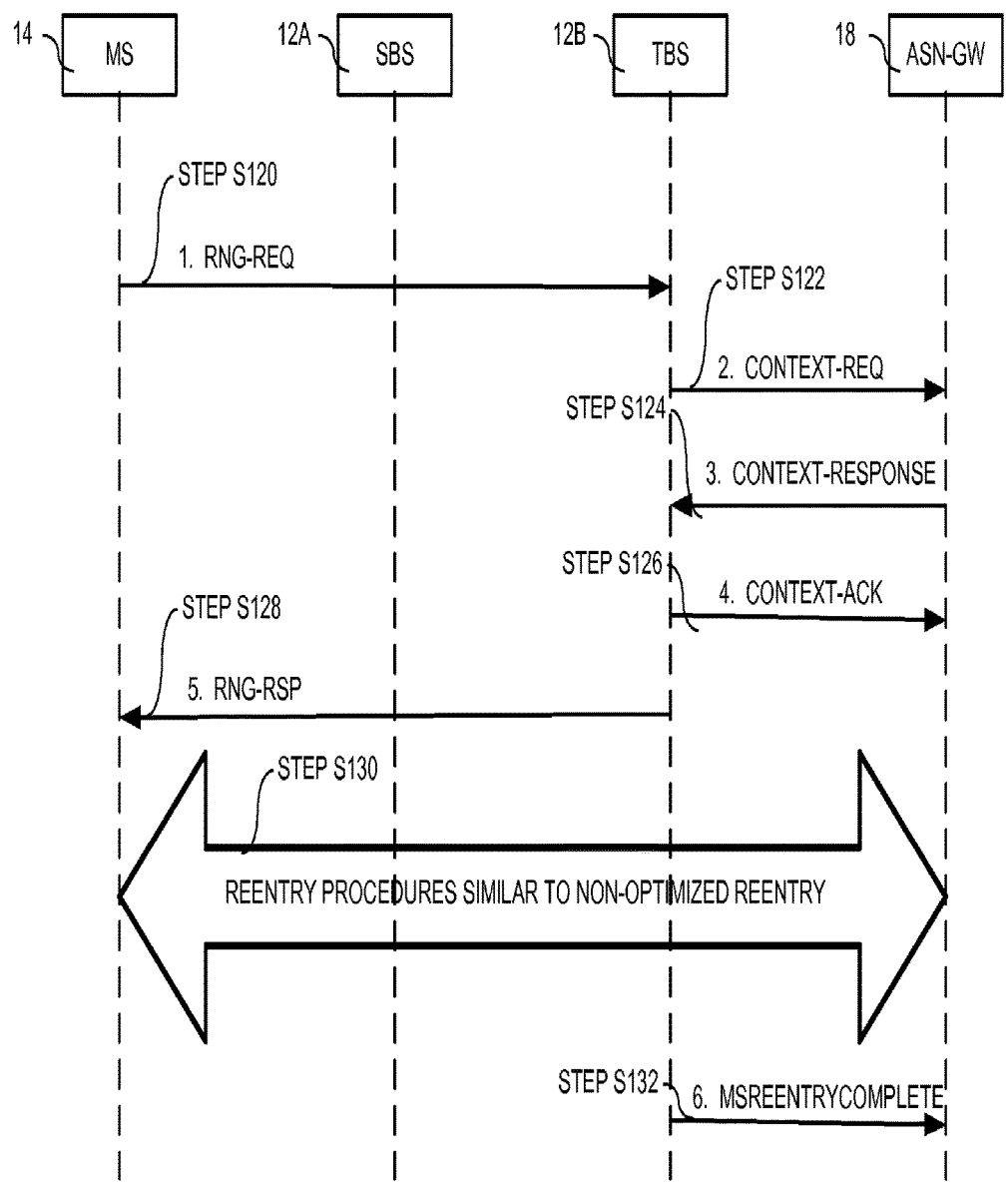
FIG. 5 is a sequence diagram illustrating a mobile station reactive handoff process.

Referring to FIG. 5, with respect to mobile station 14, the mobile station 14 initiates a reactive handoff request by sending a ranging request, e.g., the IEEE 802.16e defined RNG-REQ message, to a target base station 12B (Step S120). In this case, the ranging request is sent to indicate the mobile station's re-entry into the network 10. The target base station 12B sends a context request message, e.g., the WiMAX NWG defined Context-REQ, to ASN GW 18 and requests the mobile station's context information (Step S122). Because mobility is disabled on the system 10, the ASN GW 18 replies with a context response without including any of the context information (Step S124) for mobile station 14. At Step S126, the target base station 12B sends a context acknowledgement message, e.g., the WiMAX NWG defined Context-ACK, to acknowledge the context-response from ASN GW 18. When the ASN GW 18 receives a context acknowledgement message, such as the WiMAX NWG defined Context-ACK, an "accounting stop" can be sent to an AAA accounting server (not shown) to stop additional charges by the previous base station 12 to the mobile station 14 account. Upon receiving the context response message without the mobile station 14 context information, target base station 12B sends a ranging response message, such as the IEEE 802.16e defined RNG-RSP to the mobile station 14 (Step S128). Since the base station 12B did not receive any mobile station 14 context information, it can neither include any connection identifier ("CID") update message, e.g., CID-UPDATE TLV, in the ranging response nor handoff optimization messages e.g., TLVs to the mobile station 14. As a result, the mobile station 14 is unable to conduct a mobile handoff to the target base station 12B and the call terminates. This means that in order for mobile 14 to establish network connectivity it must perform a full network reentry. Accordingly, once mobile station 14 receives the ranging request (RNG-RSP) from the base station 12B, and that ranging request is without any optimization TLV or a CID-UPDATE TLV, the mobile station 14 will perform network entry procedures.

In general, the procedures that a mobile station 14 performs when entering a network includes performing basic capability negotiations via the exchange of subscriber station basic capability ("SBC") request and SBC response with the network. Next, authentication and authorization of the mobile station 14 is performed and the exchange of registration request and registration response with the network is completed. A negotiation for security keys occurs and the network can set up the service flows, which are the connections by which information packets are transmitted and received to complete the entry procedures (Step S130). At Step S132, the re-entry into the system 10 by mobile station 14 is complete.

Figure 6:
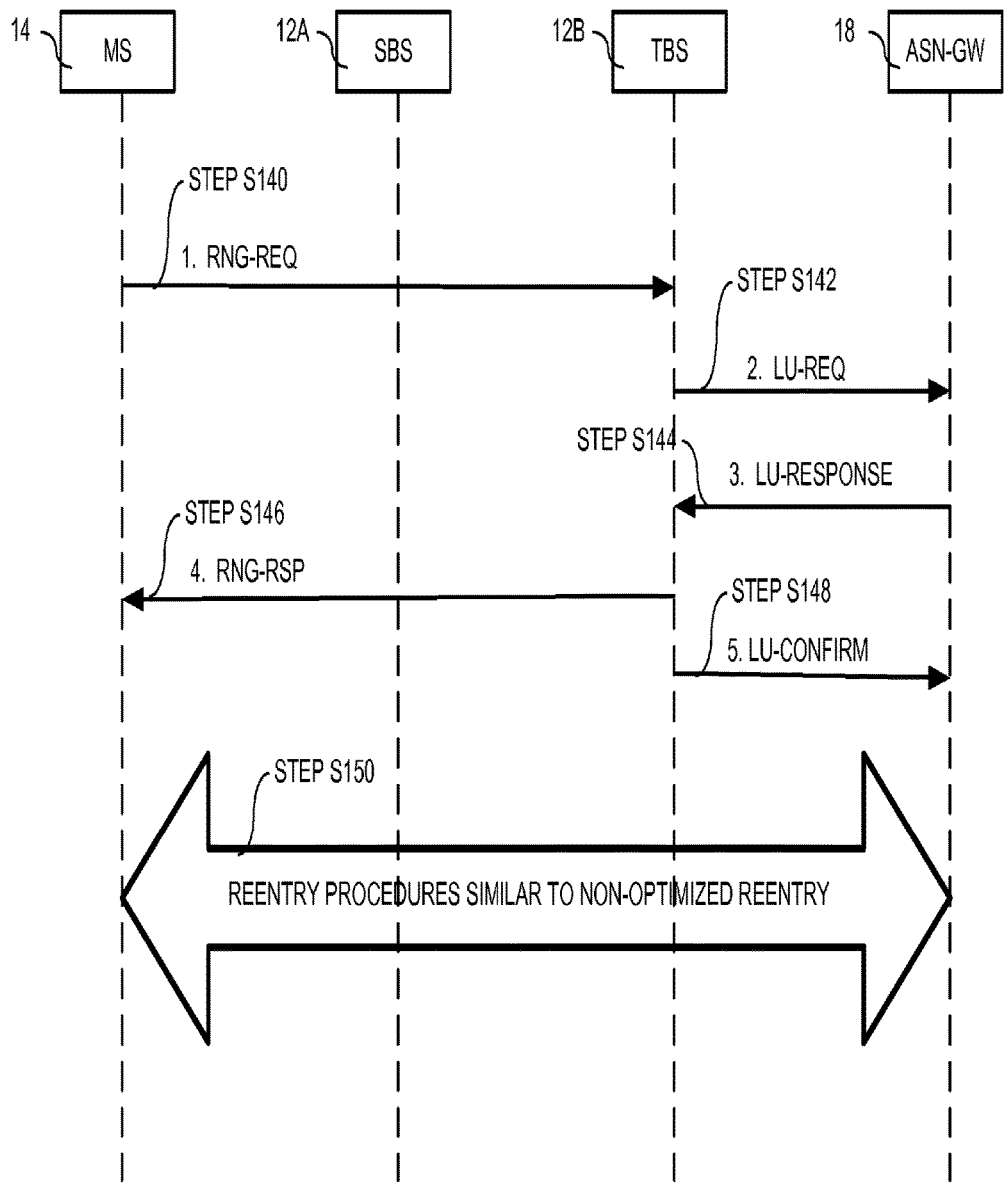
FIG. 6 is a sequence diagram illustrating a location update process.

Referring to FIG. 6, with respect to mobile station 14, the mobile station 14 is forced to perform a full network re-entry from idle mode if location update ("LU") is performed via a base station other than the base station through which the mobile station either entered idle mode or performed a successful location update. FIG. 6 illustrates a mobile station 14 initiating a location update by sending a ranging request, e.g., RNG-REQ to a target base station 12B (Step S140). The target base station 12B sends a location update request message, e.g., LU-REQ, to the paging controller of the ASN GW 18 and requests location update (Step S142). Because mobility is disabled on the network and the location update request is coming from a new base station 12B, the ASN GW 18 paging controller replies with a location update response without any of the context information for mobile station 14 (Step S144). Upon receiving the location update response without mobile station 14 context information, target base station 12B sends a ranging response message, e.g., RNG-RSP message to the mobile station 14 indicating that location update failed, e.g., location update response equal to "failure" (Step S146). At Step S148, the target base station 12B sends a location update confirmation, e.g., LU-Confirm to acknowledge the LU-response from paging controller of ASN GW 18. Once mobile station 14 receives the ranging response message, e.g., RNG-RSP without any handoff optimization TLV, the mobile station 14 will perform all network entry procedures as discussed previously with respect to FIG. 5 and Step S130. At Step S150, the mobile station 14 can send a subscriber base station capabilities request, e.g., SBC-REQ to commence the network re-entry process.

Figure 7:
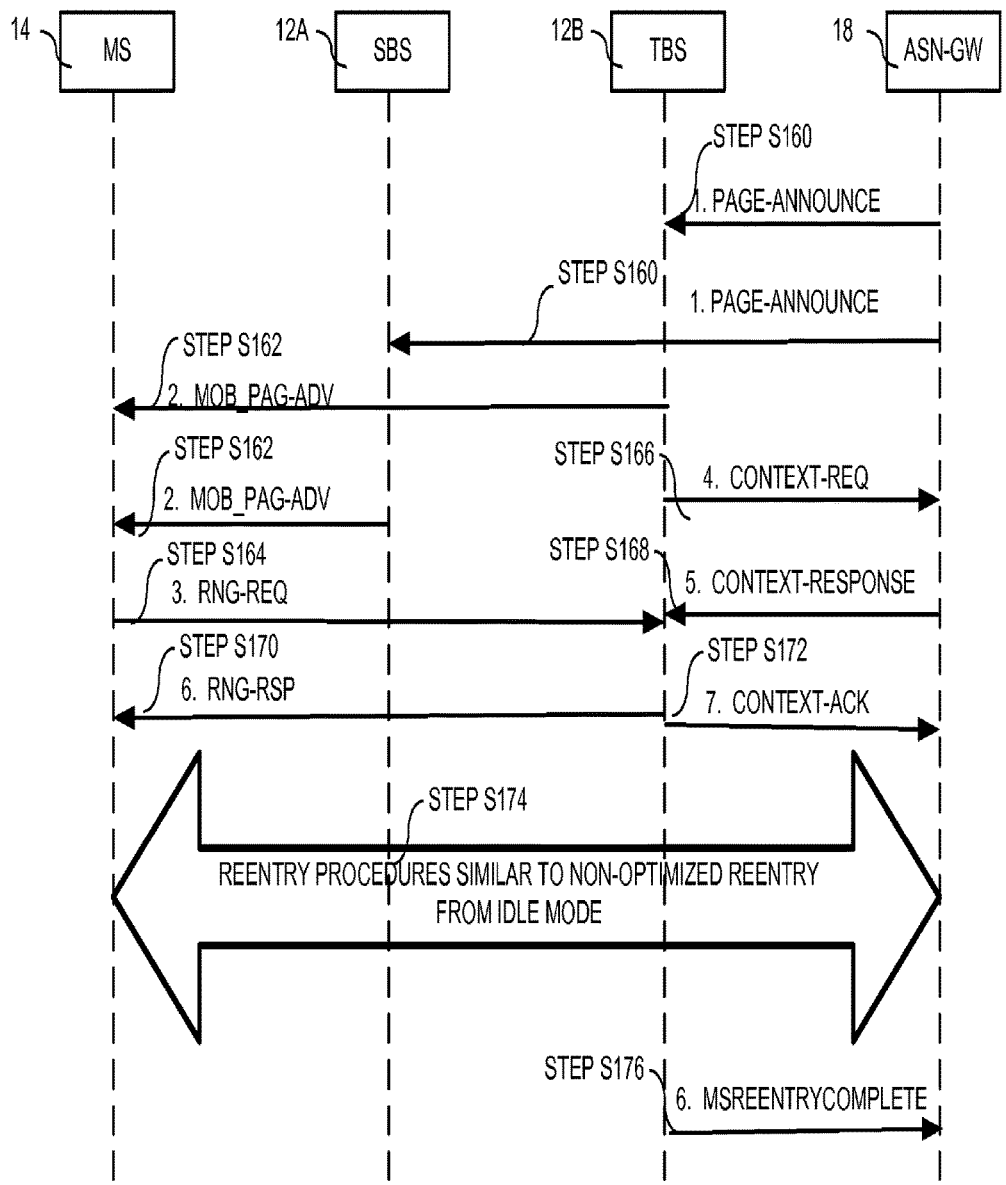
FIG. 7 is a sequence diagram illustrating a network initiated idle mode exit process.

Referring to FIG. 7, with respect to mobile station 14, the mobile station 14 is forced to perform a full network re-entry from idle mode if the network initiates a network idle mode exit page in order to transmit a downlink packet received on behalf of the idle mobile station 14, when the mobile station 14 has moved into a coverage area of a new base station 12B. FIG. 7 illustrates an ASN GW 18 initiating a paging announcement to all base stations 12 in mobile station's 14 current paging group without any of mobile station's 14 context information (Step S160). The serving and target base stations 12 receiving the paging announcement will page the mobile station 14 by sending out a mobile paging advertisement, e.g., MOB_PAG-ADV, to the mobile station 14 to inform it to re-enter the network (Step S162). Mobile station 14 re-enters the network at one of the base stations 12 by sending a ranging request, e.g., RNG-REQ with ranging purpose set to re-entry from idle mode (Step S164). New serving base station 12B sends a context request e.g., CONTENT-REQ to obtain mobile station's 14 context from the paging controller ("PC") of ASN GW 18 (Step S166). Since mobility is disabled by the ASN GW 18, the paging controller determines that mobile station 14 has moved to a different base station 12B and sends a Context-Response without any of mobile station's context information (Step S168). Upon receiving the location update response without mobile station's 14 context information, at Step S170, new serving base station 12B sends a ranging response message, e.g., RNG-RSP message without any handoff optimization TLV or CID-UPDATE TLV to the mobile station 14 informing the mobile station 14 to perform all network entry procedures as discussed previously with respect to FIG. 5 and Step S130. At Step S172, the new serving base station 12B sends a content acknowledgement message, e.g., CONTENT-ACK, to acknowledge the content response from paging controller of ASN GW 18. At Step S174, the mobile station 14 will perform all network entry procedures as discussed previously with respect to FIG. 5 and Step S130. At Step S176, the mobile station's 14 re-entry into the network is complete.

Figure 8:
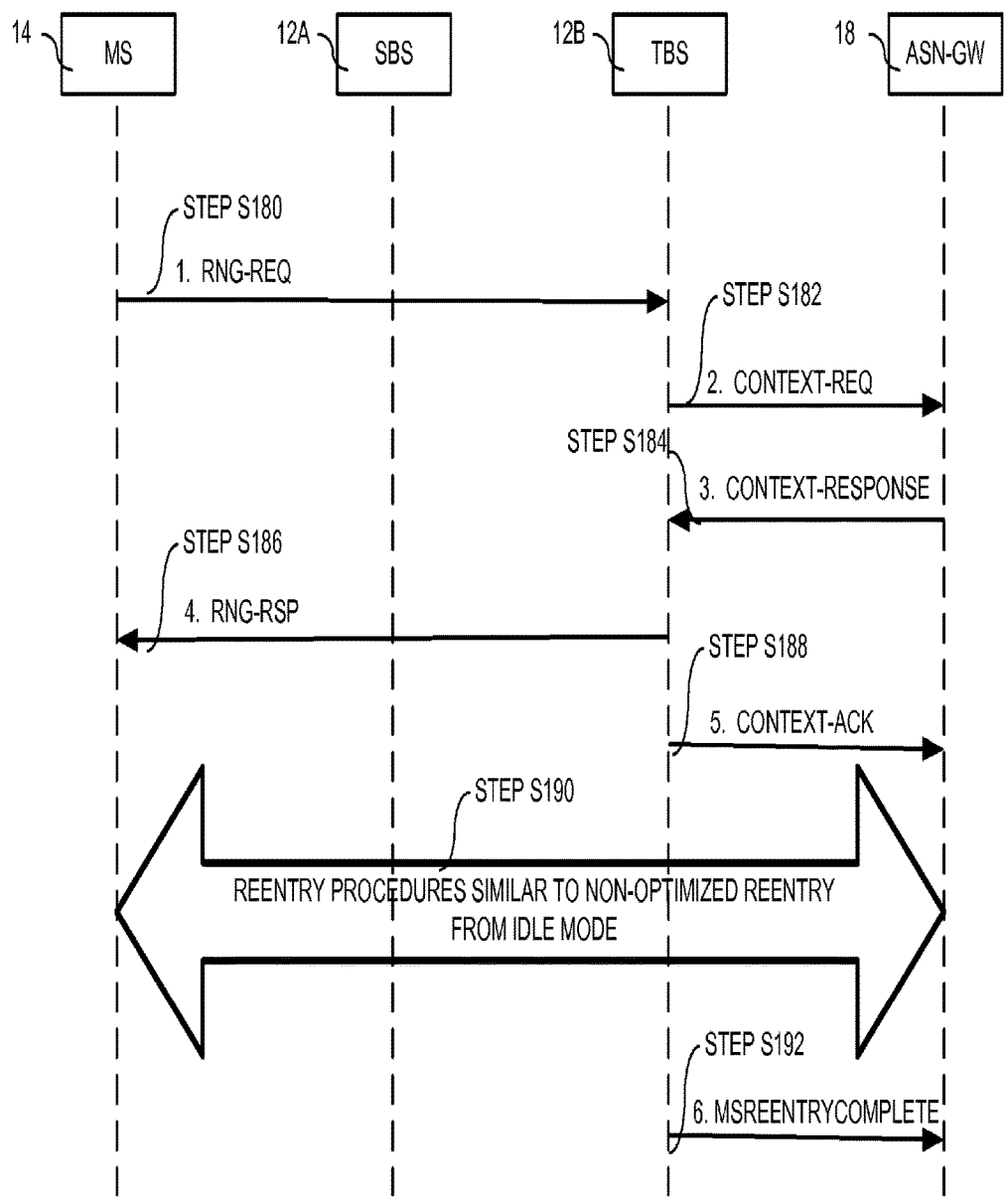
FIG. 8 is a sequence diagram illustrating a mobile station initiated idle mode exit process.

Referring to FIG. 8, with respect to mobile station 14, the mobile station 14 is forced to perform a full network re-entry when the mobile station 14 attempts idle mode exit via a base station 12B other than the one at which the mobile station 14 either entered idle mode or performed a successful location update. FIG. 8 illustrates a mobile station 14 initiating a location update by sending a ranging request, e.g., RNG-REQ, to a target base station 12B indicating intention to re-enter the network from the idle mode (Step S180). The target base station 12B sends a context request message, e.g., CONTEXT-REQ, to the ASN GW 18 and requests context information (Step S182). Because mobility is disabled on the network and the context request is coming from a new base station 12B, the ASN GW 18 paging controller replies with a context response ("CONTEXT-RESPONSE") without any of the mobile's context information (Step S144). Upon receiving the context response without mobile station 14 context information, target base station 12B sends a ranging response, e.g., RNG-RSP message to the mobile station 14 without the handoff optimization TLV and CID-UPDATE TLV (Step S16). At Step S148, the target base station 12B sends a context acknowledgement message, e.g., Content-ACK, to acknowledge the Content-response from paging controller of ASN GW 18. Once mobile station 14 receives the ranging response, e.g., RNG-RSP without any handoff optimization TLV, the mobile station 14 will perform all network entry procedures as discussed previously with respect to FIG. 5 and Step S130. At Step S190, the mobile station 14 will perform all network entry procedures as discussed previously with respect to FIG. 5 and Step S130. At Step S192, mobile station's 14 re-entry into the network is complete.

The present invention advantageously provides a method, system and apparatus for restricting full or partial mobility support for IEEE 802.16e compliant wireless devices without requiring any changes to the IEEE 802.16e standard, the Network Architecture as defined by the WiMAX Forum or the over the air control messages exchanged between the wireless device and the network by employing a mobility disabling control module. By employing this improved mobility disabling control scheme, the communication network operator can comply with governmental regulations without having to revert to costly replacement systems. Of course, it is understood that the present invention is not limited to IEEE 802.16e compliant wireless networks and that the invention can be implemented in any wireless network that includes the ability to hand off communications with a wireless device among different base stations.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method of transitioning a mobile station from a first base station to a second base station in a wireless network, the method comprising:
by the mobile station in a first service region served by the first base station:
moving into a second service region served by the second base station in the wireless network, wherein handoff of a connection between the first and second base stations is prevented by the wireless network;
in response to the handoff being prevented, receiving a message to terminate the connection from the wireless network;
transmitting a request for network re-entry of the mobile station in the second service region; and
receiving a response permitting re-entry of the mobile station in the second service region.

2. The method of claim 1, wherein handoff between the first and second base stations is prevented based on at least one mobility preference of the wireless network.

3. The method of claim 1, wherein the first service region is served by a first plurality of base stations including the first base station and wherein the mobile station is permitted to handoff connections between base stations of the first plurality of base stations.

4. The method of claim 1, wherein said transmitting the request for network re-entry is performed to the second base station and wherein said receiving the response permitting re-entry of the mobile station is performed from the second base station.

5. The method of claim 1, wherein the request comprises a context request, and wherein the response comprises a context response.

6. The method of claim 1, wherein the request is part of a full network entry procedure by the mobile station.

7. The method of claim 1, wherein receiving the message to terminate the connection is received from the second base station.

8. An apparatus, comprising:
one or more processors, wherein the one or more processors are configured to cause a mobile station to
attempt handoff from a first service region served by a first base station to a second service region served by a second base station in the wireless network, wherein handoff of a connection between the first and second base stations is prevented by the wireless network;
in response to the handoff being prevented, receive a message to terminate the connection from the wireless network;
transmit a request for network re-entry of the mobile station in the second service region; and
receive a response permitting re-entry of the mobile station in the second service region.

9. The apparatus of claim 8, wherein handoff between the first and second base stations is prevented based on at least one mobility preference of the wireless network.

10. The apparatus of claim 8, wherein the first service region is served by a first plurality of base stations including the first base station and wherein the mobile station is permitted to handoff connections between base stations of the first plurality of base stations.

11. The apparatus of claim 8, wherein said transmitting the request for network re-entry is performed to the second base station and wherein said receiving the response permitting re-entry of the mobile station is performed from the second base station.

12. The apparatus of claim 8, wherein the request comprises a context request, and wherein the response comprises a context response.

13. The apparatus of claim 8, wherein the request is part of a full network entry procedure by the mobile station.

14. The apparatus of claim 8, wherein receiving the message to terminate the connection is received from the second base station.

15. A mobile station, comprising:
wireless communication circuitry, configured for communication with a wireless network;
one or more memory mediums storing program instructions;
one or more processors coupled to the one or more memory mediums and the wireless communication circuitry, wherein the one or more processors are configured to execute the program instructions to:
attempt handoff from a first service region served by a first base station to a second service region served by a second base station in the wireless network, wherein handoff of a connection between the first and second base stations is prevented by the wireless network;
in response to the handoff being prevented, receive a message to terminate the connection from the wireless network;
transmit a request for network re-entry of the mobile station in the second service region; and
receive a response permitting re-entry of the mobile station in the second service region.

16. The mobile station of claim 15, wherein handoff between the first and second base stations is prevented based on at least one mobility preference of the wireless network.

17. The mobile station of claim 15, wherein the first service region is served by a first plurality of base stations including the first base station and wherein the mobile station is permitted to handoff connections between base stations of the first plurality of base stations.

18. The mobile station of claim 15, wherein said transmitting the request for network re-entry is performed to the second base station and wherein said receiving the response permitting re-entry of the mobile station is performed from the second base station.

19. The mobile station of claim 15, wherein the request comprises a context request, and wherein the response comprises a context response.

20. The mobile station of claim 15, wherein the request is part of a full network entry procedure by the mobile station.

* * * * *